United States Patent [19]
Brodene et al.

[11] Patent Number: 5,182,882
[45] Date of Patent: Feb. 2, 1993

[54] HEATER CORES HAVING EXPOSED SURFACES BURNISHED BY WET BLASTING

[75] Inventors: Timothy Brodene, East Amherst; Michael Plotner, Tonawanda; Bruce Cramer, Buffalo, all of N.Y.

[73] Assignee: FEDCO Automotive Components Co., Inc., Buffalo, N.Y.

[21] Appl. No.: 816,037

[22] Filed: Dec. 30, 1991

[51] Int. Cl.$^5$ .............................................. B24B 1/00
[52] U.S. Cl. ........................................ 51/317; 51/319; 51/418; 51/424
[58] Field of Search ............... 51/317, 318, 319, 323, 51/326, 410, 418, 424, 425, 426

[56] References Cited
U.S. PATENT DOCUMENTS

| | | | |
|---|---|---|---|
| 293,011 | 2/1884 | Hall et al. | 51/318 |
| 2,240,248 | 4/1941 | Turnbull | 51/418 |
| 2,923,109 | 2/1960 | Pelley | 51/318 |
| 3,520,086 | 7/1970 | Stevens | 51/418 |
| 3,847,760 | 11/1974 | Malak | 51/317 |
| 3,879,902 | 4/1975 | Haberlin | 51/319 |
| 4,254,505 | 3/1981 | Scheiber et al. | 51/317 |
| 4,614,064 | 9/1986 | Bailey et al. | 51/319 |

*Primary Examiner*—M. Rachuba
*Attorney, Agent, or Firm*—Ladas & Parry

[57] ABSTRACT

A heater core is freed of solder and flux contaminants produced during its manufacture by burnishing the exposed surfaces of the heater core by a wet blasting operation with a slurry of abrasive particles. The burnishing of the cores is achieved in a continuous operation in which the heater cores are advanced in succession through a housing from a loading station to an unloading station. In the housing, the heater cores are burnished with jets of slurry from nozzles after which the heater cores are rinsed with water. The slurry is recycled and maintained at a particular concentration and pH for uniform treatment of the successive heater cores.

19 Claims, 5 Drawing Sheets

HEATER CORES HAVING EXPOSED SURFACES BURNISHED BY WET BLASTING

FIELD OF THE INVENTION

The invention relates to improvements in heater cores and particularly to heater cores having burnished surfaces and to methods and apparatus for burnishing the surfaces of heater cores at a high capacity by wet blasting.

BACKGROUND

Conventional heater cores are produced by soldering side tanks or manifolds to a core element comprised of, a succession of juxtaposed corrugated fin units which are joined together and define respective air and liquid passages. The liquid passages are connected to the side tanks for circulation of the liquid through the liquid passages where the liquid undergoes heat exchange with air passing through the air passages. In the course of manufacture, the exposed surfaces of the heater core are normally covered with flux and solder leading to objectionable discoloration of the heater core.

Various attempts have been made to remove the flux and solder deposits but none have proved successful, especially in mass production at a high volume or capacity.

Attempts have been made to clean the flux and solder impurities from the exposed surfaces of the heater cores by air blasting a dry sand mixture against the heater cores; this has proved to be unsuccessful because of the excessive dust which is produced and particularly because the dust contains particles of lead from the solder. The creation of such a pollutant atmosphere is unacceptable in the workplace.

Other methods of treatment of the heater cores have involved chemical treatment by immersion of the cores into a chemical treatment bath. This has a number of disadvantages, including the maintenance of such a bath and the inability to provide a high capacity treatment process.

Another method of treating the exposed surfaces of the heater cores involves painting the surfaces to conceal the flux and solder deposits. Such a process is expensive, is difficult to achieve on a mass production basis and involves dispersal of harmful ingredients into the atmosphere.

It is known to clean articles, to remove grease, scales, burrs, dirt, rust and surface contaminants by a wet blasting treatment in which abrasive particles are contained in a liquid. Such wet blasting treatments have the advantage of eliminating dust and permitting finer abrasive particles to be used as compared to the use of abrasive particles in a dry blasting operation.

The conventional wet blasting techniques are not compatible with high capacity treatment of heater cores on a mass production basis. Furthermore, the wet blast liquid leaves a residue of abrasive particles on the treated workpieces which although acceptable in other uses is not desirable in the case of heater cores.

SUMMARY OF THE INVENTION

An object of the invention is to provide improvements in a heater core in which the exposed surfaces of the heater core are burnished by wet blasting of the surfaces with an abrasive slurry to mechanically and chemically burnish the exposed surfaces.

A further object of the invention is to provide a method by which the burnishing of the surfaces can be achieved at a high volume or capacity in a mass production operation.

Yet another object of the invention is to provide a treatment of the heater cores to burnish the exposed surfaces and concurrently to wash out the air passages to remove excess slurry deposited therein at the time of burnishing.

A further object of the invention is to provide a method and apparatus for burnishing the surfaces of heater cores such that no pollutants are produced in the atmosphere.

Yet another object of the invention is to provide apparatus for burnishing the exposed surfaces of heater cores wherein the heater cores are continuously fed through a self-contained apparatus in a high capacity operation.

In accordance with the invention, the flux and solder impurities normally left on the exposed surfaces of the heater core are removed by a wet blasting of the exposed surfaces with an abrasive slurry to mechanically and chemically burnish the exposed surfaces.

In further accordance with the invention, the abrasive slurry is in the form of a jet of a slurry of microscopic glass beads mixed with water and discharged against the surfaces of the heater cores at an alkaline pH; preferably the slurry includes an alkaline polishing agent such as sodium metasilicate.

According to a feature of the invention, heater cores are advanced in succession on a conveyor through a blast chamber in which the slurry jet is discharged under pressure against the advancing heater cores such that the exposed surfaces are burnished.

In further accordance with the method of invention, the heater cores advancing on the conveyor are subjected to a rinsing treatment of the exposed surfaces to remove any accumulated slurry thereon subsequent to the wet blasting of the exposed surfaces by the slurry.

In further accordance with the invention, a workpiece loading station is provided at which the heater cores can be placed on the conveyor, one after the other, for conveyance through the wet blasting and rinsing stations after which the now burnished workpieces can be removed at an unloading station of the conveyor. The heater cores are conveyed by the conveyor through a housing in which the wet blasting and rinsing treatments are carried out.

In further accordance with the invention, the slurry of abrasive particles is collected in a sump beneath the conveyor from which the slurry is recycled to nozzles at the blast station which effect the burnishing of the advancing heater cores, the invention further comprising adjusting the pH of the circulating slurry so that it will have an alkaline pH within a specified range.

In further accordance with the invention, the nozzles which direct the slurry against the heater cores at the wet blasting station, are aligned with one another on opposite sides of the advancing heater cores at an inclination relative to the direction of travel of the conveyor. A resilient pressing force is applied to the heater cores to hold them on the conveyor as they pass the nozzles at the wet blasting station.

A further object of the invention is to provide a particular construction of the conveyor which will allow the slurry and rinse liquid to pass from the heater cores to and through the conveyor.

DETAILED DESCRIPTION OF PREFERRED EMBODIMENT

Figure 1:
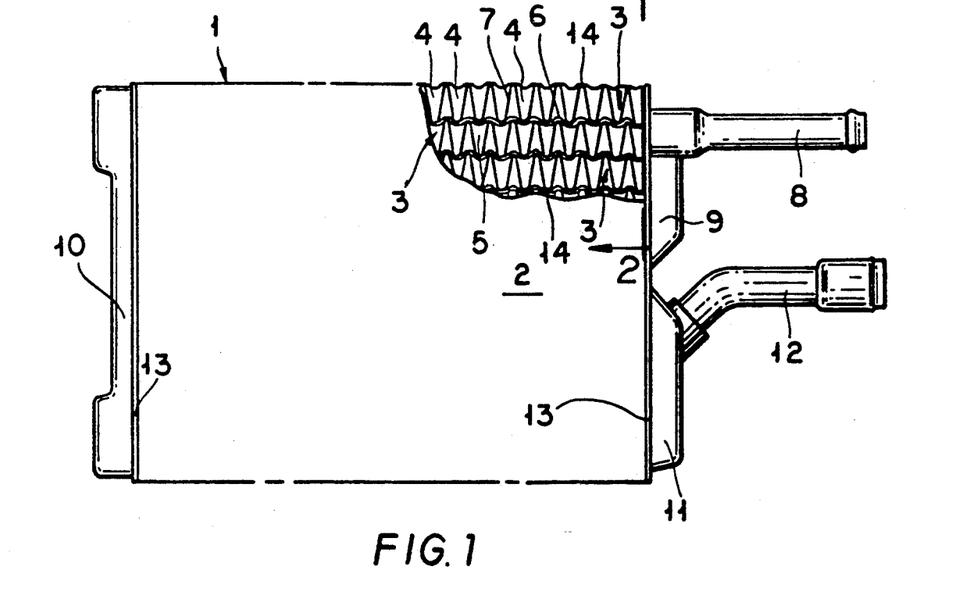
FIG. 1 is a side elevational view, partly broken away, of a heater core treated according to the invention.
Figure 2:
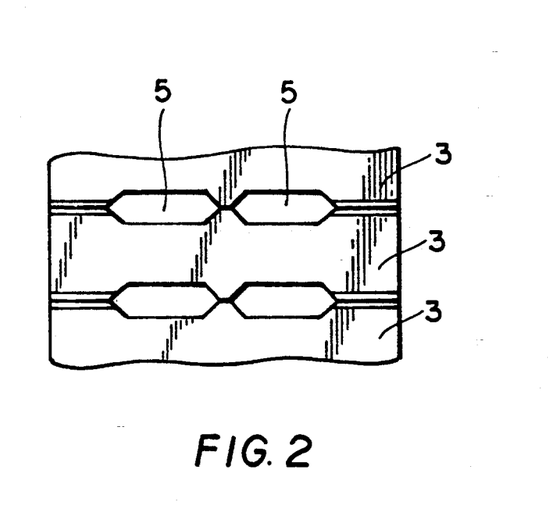
FIG. 2 is a sectional view on enlarged scale of a portion of the heater core.
Figure 3:
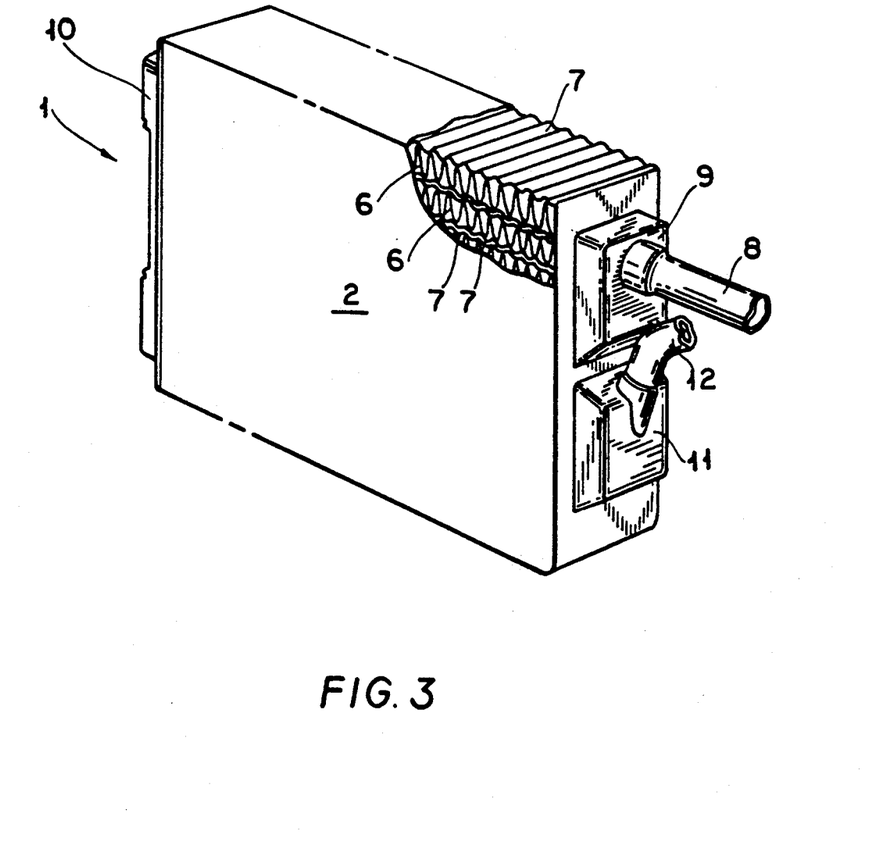
FIG. 3 is a perspective view, partly broken away, of the heater core.

FIGS. 1 and 2 show a heater core 1 which is subject to the treatment provided by the present invention. The heater core 1 comprises a core element 2 composed of a succession of juxtaposed corrugated fin units 3 which are joined together and define air and liquid passages 4 and 5 respectively. More particularly, each unit 3 is comprised of an outer fin element 6 which wraps around and encloses an inner fin element 7. When the units 3 are juxtaposed on one another, the outer fin elements 6 are in contact and form the liquid passages 5. The air passages 4 are defined in the hollows of the inner fin element 7 and extend perpendicularly to the liquid passages 5. At the sides of the heater core 1 manifolds or tanks are provided for circulating liquid through the heater core. More specifically at the right side of the core 1 in FIG. 1, an inlet tube 8 for liquid is connected to a tank 9 which communicates with the liquid passages 5 in the upper half of the core 1 so that liquid supplied to tube 8 flows through these liquid passages 5 in the core. At the left side of the core 1, a tank 10 communicates with all the liquid passages 5 so that liquid flowing to tank 10 can return through the liquid passages 5 in the lower half of the core to a tank 11 communicating with these passages for discharge of the liquid through an outlet tube 12. The liquid flowing through the liquid passages 5 undergoes heat exchange with air flowing through the air passages 4.

In order to assemble the tanks 9-11 to the core element 2 and connect the fin elements as a rigid assembly therewith, the tanks and fin elements are soldered together. In this regard, the tanks 9-11 are soldered to end faces of the outer fin elements 6 at solder joints 13 and the inner and outer fin elements are soldered together at joints 14 at their contact points at side faces of the core 1.

The tanks 9-11 and outer fin elements 6 can be made from brass and the inner fin elements 7 from copper or aluminum. The tubes 8 and 12 can be made from copper or aluminum.

Due to the soldering of the tanks and fin elements in the assembly of the heater core, deposits of solder, flux and other impurities coat the surfaces of the core and are objectionable not only in and of themselves but also because of the discoloration which they cause. Heretofore, a number of techniques were employed to remove or cover the impurities including dipping the cores into chemical etching solutions, painting or coating the outer surfaces of the endmost fin elements 7 and the tanks 9-11, and air blasting the heater cores with an abrasive powder. These techniques are all disadvantageous from various standpoints including cost, efficacy, and technical complexity. The air blast technique is especially troublesome because of production of harmful airborne particles, especially lead.

The invention provides a method and apparatus for burnishing the outer surfaces of the heater core and for flushing the interior of the core element to remove all deposits therein, including flux, solder and the like and provide the heater core with a permanent burnished outer surface, especially the surfaces of the tanks and the endmost outer fin elements at the perimeter of the core. Essentially this is achieved by burnishing, with a wet abrasive slurry, the outer surfaces of tanks 9-11 and the outer surfaces of the endmost fin elements 6 so that the entire perimeter of the narrow side surface of the heater core is highly polished and free of surface impurities, such as flux, solder and the like. The burnishing of the side surfaces with the wet abrasive slurry provides these surfaces with a permanent burnished finish which will not significantly oxidize in air.

FIGS. 4-8 illustrate an apparatus 100 for burnishing the outer surfaces of heater cores. The apparatus is characterized by its capability of treating heater cores on a continuous basis in which wet blasting of the exposed core surfaces is effected while the heater cores are continuously traveling.

Figure 8:
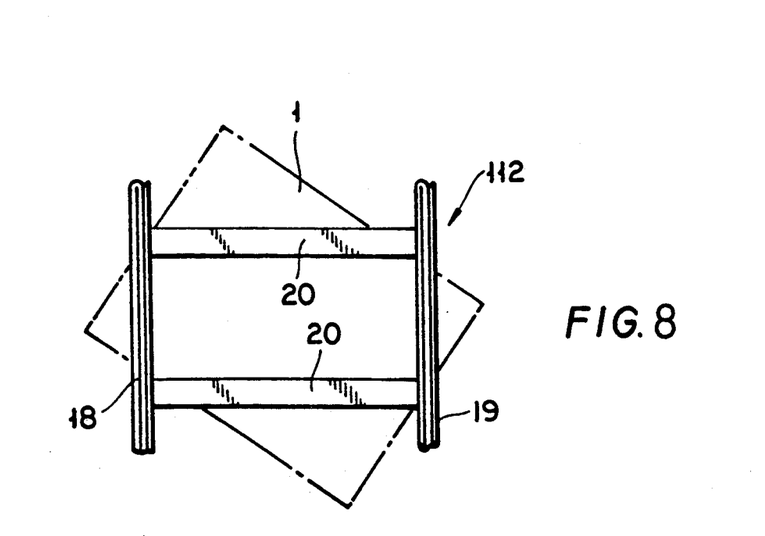
FIG. 8 is a top plan view of the conveyor in FIG. 7.

The apparatus comprises a frame 111 which supports an endless conveyor 112 having upper and lower runs 113, 114. The conveyor 112 travels over sprocket wheels 15 and 16, the latter being driven by a motor 17 to drive the conveyor in a direction in which the upper run 113 travels in the direction of the arrows in FIGS. 4 and 5. The conveyor 111 is of open-link construction as shown in FIG. 8 and comprises side plates 18, 19 to which are connected cross-links 20 providing an open construction allowing passage of liquid through the conveyor. Affixed to the side plates 18, 19 are a succession of ribs 21 which carry brushes 22 thereon.

Figure 4:
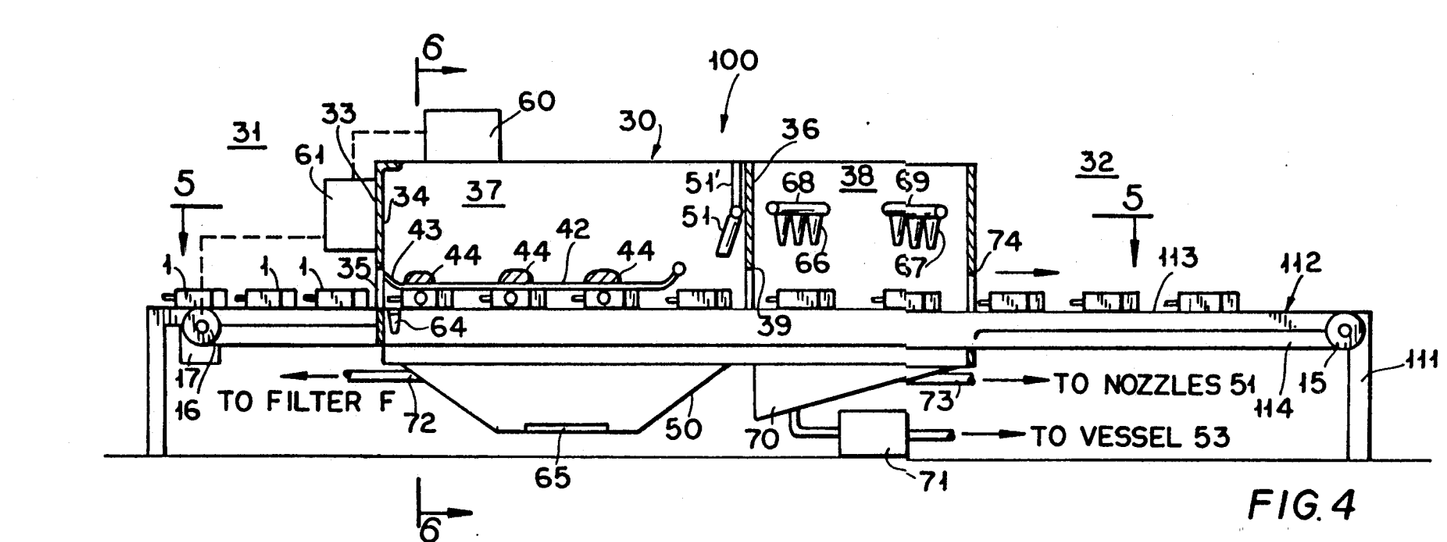
FIG. 4 is a diagrammatic side elevational view, partly broken away, of one embodiment of apparatus for burnishing heater cores.
Figure 5:
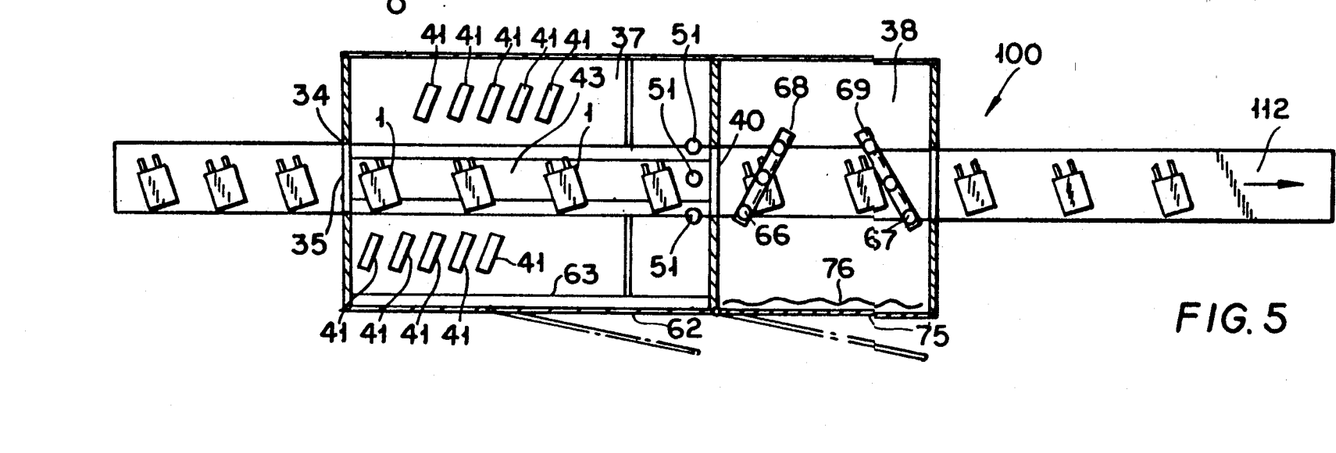
FIG. 5 is a sectional view taken along line 5—5 in FIG. 4.
Figure 6:
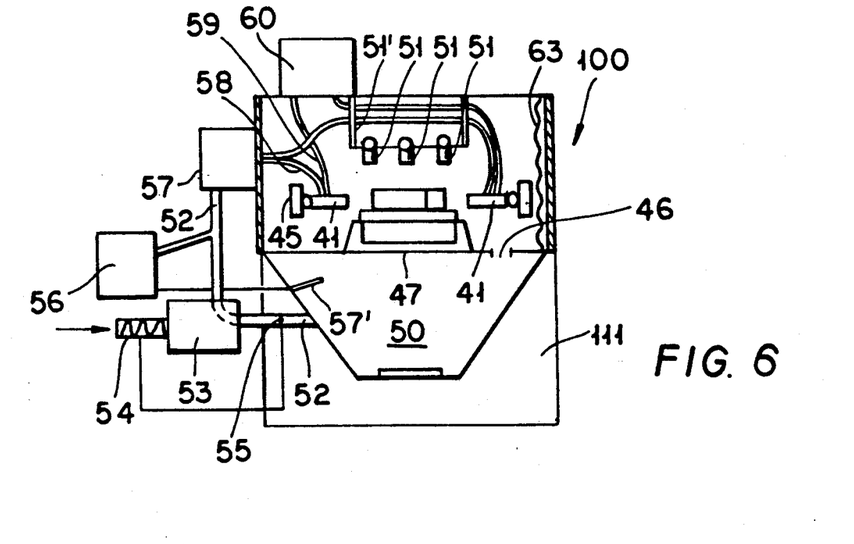
FIG. 6 is a diagrammatic sectional view taken along line 6—6 in FIG. 4.
Figure 7:
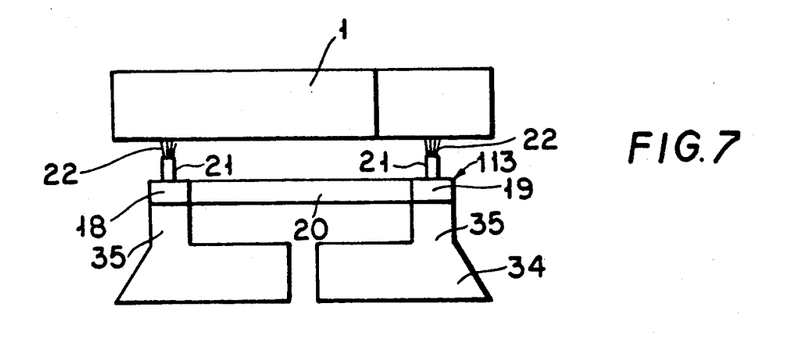
FIG. 7 is an enlarged end view of a conveyor in the apparatus of FIG. 4.

The frame 111 supports an enclosed housing 30 in a location so that at the left of FIG. 4 an inlet or loading station 31 is formed adjacent to an inlet end of the housing 30 whereas an exit or unloading station 32 is furnished at the right adjacent to an outlet end of the housing 30. At the inlet station 31, the heater cores 1 are placed by an operator, at predetermined spacing, on the upper run 113 of the conveyor, one after the other, for successive advancement by the conveyor through the housing 30. The heater cores 1 are placed on the conveyor with their tubes 8 and 12 pointed laterally and upstream relative to the direction of conveyor travel in order to facilitate burnishing of the exposed surfaces of the heater cores as will become evident later. At the inlet end of the housing, a front wall 33 is provided with a cutout 34 at which is disposed a flexible closure curtain 35 through which the successively advancing heater cores 1 are permitted to pass. When the heater cores 1 are placed on the conveyor 112, they are supported on the brushes 22 in slightly elevated position above the links 20 and side plates 18, 19 of the upper run 113 of the conveyor. The top of the frame 111 is formed as a mounting block 34 shown in FIG. 7 which comprises upstanding beams 35 which support the side plates 18 and 19 of the conveyor as the conveyor travels on the frame 111. The housing 30 is provided with an interior dividing wall 36 which forms a first chamber 37 connected to the inlet end of the housing and a second chamber 38 connected to the outlet end of the housing. The dividing wall 36 has a cutout 39 at its lower end with a flexible closure curtain 40 supported at the cutout to allow the heater cores 1 to pass therethrough. The flexible curtains 35 and 40 can be composed of a plurality of suspended plastic strips which are secured to the respective walls 33 and 36 at their upper ends.

The chamber 37 serves as a blast chamber containing nozzles 41 for directing a jet of wet abrasive slurry against the heater cores 1 to burnish the exposed surfaces thereof. The nozzles 41 are arranged on opposite sides of the conveyor in facing relation to the heater cores 1 which are advancing on the upper run 113 of the conveyor. The nozzles 41 are inclined at an angle relative to the direction of advancement of the conveyor, preferably at an angle of 10° to 20°. The heater cores 1 are angularly positioned on the conveyor, preferably at an angle of about 30° to 45°. The arrangement is such that the nozzles 41 will direct the abrasive slurry against the entire perimetral surface of the heater cores. The nozzles 41 on the opposite sides of the conveyor are aligned with one another so that no net lateral force will be applied to the heater cores 1. Nevertheless, it has been found that due to the high pressure of the slurry being discharged against the heater cores, these tend to become dislodged from the conveyor and in order to apply a resilient holding force to press the heater cores 1 against the conveyor, a holding means 42 is employed. The holding means 42 comprises a thin metal sheet 43 secured at its ends to the housing 30. The holding means 42 further comprises a plurality of individual weights 44 which are freely placed on the metal sheet 43 to resiliently press the metal sheet against the tops of the heater cores 1 to hold the heater cores on the conveyor while permitting the heater cores to advance with the conveyor through the blast chamber 37 in the housing. The individual weights 44 can be composed of lead shot placed in a rubber membrane cover. The metal sheet 43 is preferably made of stainless steel. The nozzles 41 which are arranged on opposite sides of the conveyor 12 are disposed in two lines of five nozzles each in a common plane with and facing the heater cores 1. Each row of nozzles 41 is supported by a bar 45 (FIG. 6) connected to the housing and each nozzle is connected to the bar 45 for universal adjustment to adjust the angle of the nozzles 41. The nozzles 41 direct the abrasive slurry against the heater cores to remove all traces of contaminants on the exposed surfaces thereof due to flux and solder and the slurry flows from the now washed heater cores to the bottom of chamber 37 through a drain opening 46 in the floor 47 of the housing into a sump 50 extending beneath the blast chamber 37. Also disposed in chamber 37 downstream of the nozzles 41 is a row of three downwards facing rinse nozzles 51 which direct a stream of rinse liquid downwardly and forwardly over the heater cores and especially through the air passages 4 formed by the corrugated fin units of the heater cores. The nozzles 51 are supported by a frame 51' in housing 30 and nozzles 51 are tilted forwardly at an angle of about 5° to 15° and serve to pre-rinse the heater cores to remove slurry adherent thereto. The rinse liquid also flows into the sump 50 with the spent slurry.

The slurry is composed of microscopic glass beads in water. The glass beads are conventional and they are mixed with the water in a concentration to provide the slurry consistency. The consistency of the slurry is similar to a loose concrete mix and slurry compositions of abrasive glass beads are per se known and require no elaboration to those skilled in the art. Suffice to say that heretofore it was not known to utilize such a slurry for burnishing heater cores as in the present invention. The rinse liquid supplied to the spray nozzles 51 is the same as the liquid for the glass beads in the slurry, namely water.

The collected slurry and rinse liquid contained in sump 50 is recirculated to nozzles 41 in the following manner. Connected to the sump 50 is a recycle pipe 52 to which is connected a vessel 53 for supply of glass beads via an inlet 54 containing a drive means such as a drive auger or pump. The drive means is driven to maintain a given concentration of the glass beads in the slurry. The concentration can be measured by sampling the slurry discharged from the sump. In a particular embodiment a sensor 55 is disposed in tube 52 and is connected to the drive means in inlet 54 to control the concentration of the slurry and maintain it within a determined range so that recycled slurry fed to the nozzles 41 will be substantially constant over the entire treatment process of the successive heater cores 1.

Additionally and significantly it has been found that over any period of treatment, the removal of the flux and solder from the heater cores will cause rapid acidification of the slurry. It has been found necessary for the successful operation to maintain the pH of the slurry within a relatively narrow alkaline range of between 9.0 and 11.0. For this purpose, an alkaline reservoir 56 is connected to the recycle pipe 52 and furnishes an alkaline material to the recycled slurry in accordance with measurement of the pH of the slurry within the sump 50 by a pH sensor 57'. In this way, the pH of the slurry fed to the nozzles 41 is maintained within the aforesaid range. In further accordance with the invention, the alkaline material in the reservoir 56 is selected to have a polishing effect on the exposed surfaces of the heater core and for this purpose the alkaline material is sodium metasilicate. The thus recycled slurry in the desired concentration of glass beads and in the desired pH range is fed under pressure by a pump 57 to the nozzles 41.

Each nozzle has one line 58 for the slurry and a second line 59 for supply of air under pressure from an air pump 60. In this way, slurry is discharged under very high pressure from the nozzles 41. A control unit 61 is mounted at the inlet end of the housing and is connected to the air pump 60 to control the pressure supplied to the lines 59. Additionally, the control means 61 is connected to the drive motor 17 of the conveyor in order to control the conveyor speed. These parameters provide for control of the pressure of the slurry and the residence time of the heater cores in the field of the nozzles 41.

The housing 30 is provided with a side access door 62 which allows an operator to adjust the placement of the weights 44 on the metal sheet 43 and to make any adjustments of direction of the nozzles 41 and 51. In front of the door 62 is a foldable plastic curtain 63 which must be pushed aside before the interior of the chamber 3 will become accessible after the door 62 has been opened.

Additionally, there is provided in chamber 37 wash nozzles 64 located above the lower run 114 of the conveyor at a location immediately before the lower run 114 exits from the housing chamber 37 in order to wash the conveyor before it reaches sprocket wheel 16 for being reversed for placement of fresh heater cores thereon.

At the bottom of sump an outlet 65 is provided for removal of glass beads which have settled to the bottom of the sump. The glass beads can be periodically introduced into the vessel 53.

In rinse chamber 38 two rows of rinse nozzles 66 and 67 are provided above the advancing heater cores 1 along opposite lines of inclination. The rinse nozzles 66, 67 are arranged on respective support tubes 68 and 69 for universal adjustment. The support tubes 68 and 69 convey fresh rinse water to the nozzles 66 and 67 which are directed downwardly to wash the heater cores and flush all traces of slurry and any remaining contaminants from the heater cores. The rinse liquid passes from the housing 30 into a sump 70 from the bottom of which heavier settled particles are removed. These settled particles are mainly composed of glass beads and they are pumped by a pump 71 to the vessel 53. The relatively clean water at the top of sump 50 is drawn off by a pipe 72 and sent to a filter F while the relatively clean water at the top of sump 70 is supplied by a pipe 73 to the pre-rinse nozzles 51. After filtering in filter F, the filtrate can be discharged and the solids collected for disposal.

After washing by the nozzles 66 and 67 in chamber 38, the heater cores pass through an outlet 74 in the housing to the unloading station 32 whereat the heater cores with burnished surfaces can be removed from the conveyor. The chamber 38 is provided with an access door 75 and a flexible curtain 76 in front of the door 75.

Figure 9:
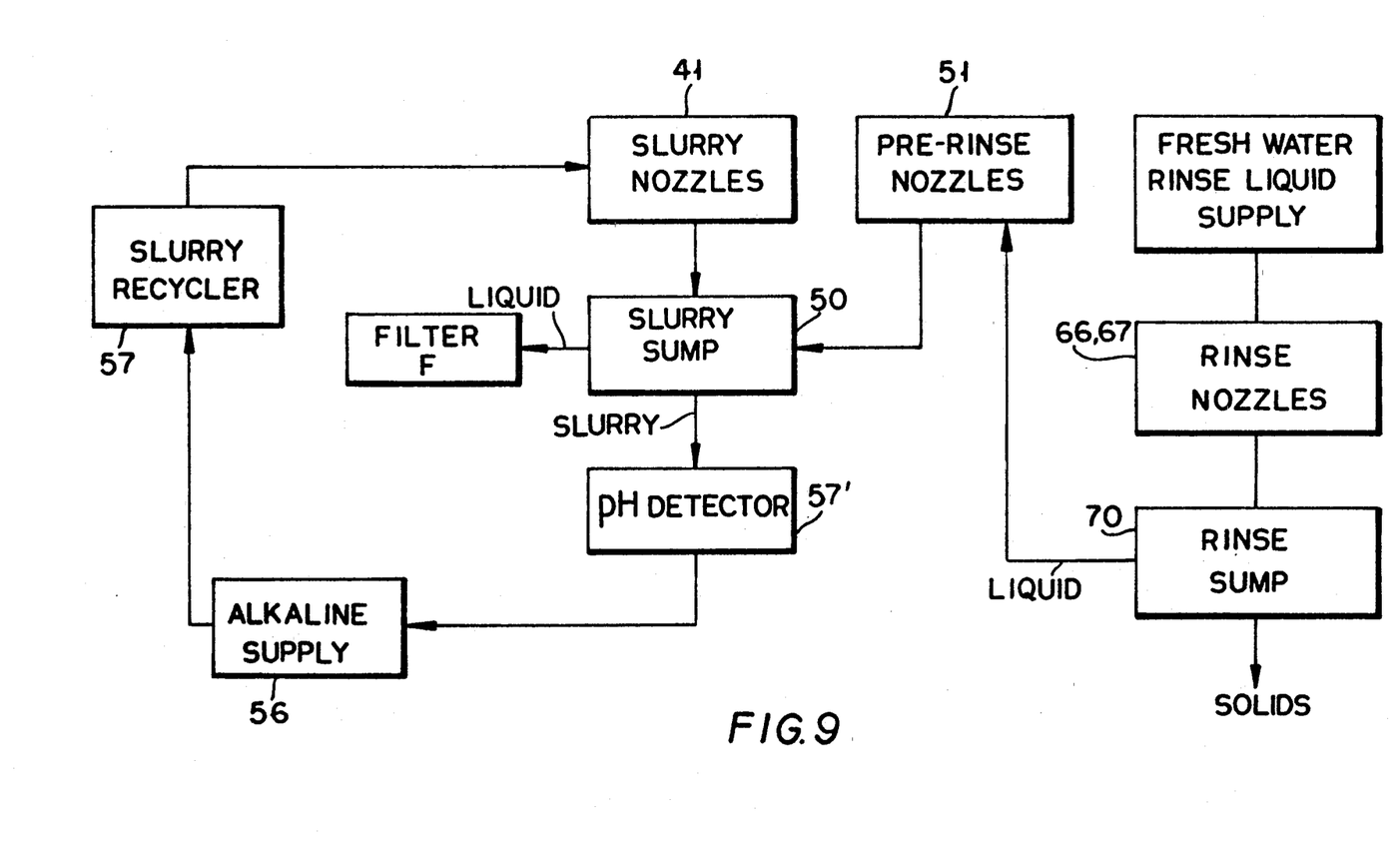
FIG. 9 is a block diagram of the process carried out by the apparatus.

The operation of the system for burnishing the heater cores is diagrammatically illustrated in block outline in FIG. 9. Therein, it is seen that after directing the slurry of abrasive particles against the heater cores by slurry nozzles 41, the slurry is collected in slurry sump 50 together with rinse liquid coming from rinse nozzles 51. The collected liquid is then adjusted by pH sensor 57 to a determined pH range by selectively adding alkaline material to the recycled slurry from vessel 56 and the slurry now adjusted in pH value is pumped by slurry pump 57 back to the nozzles 41. In this way, a continuous operation is obtained as the heater cores are successively advanced by the conveyor through the housing 30. As evident from the above, therefore, a continuous process has been provided for the continuous treatment of heater cores which are successively placed at the inlet station 31 onto the conveyor and removed at the unloading station 32 after having been treated in the housing 30 to burnish the exposed surfaces of the heater cores while also flushing out the air passages thereof.

Although the invention has been described in relation to specific embodiments thereof, it will become apparent to those skilled in the art that numerous modifications and variations can be made within the scope and spirit of the invention as defined in the attached claims.

What is claimed is:

1. Apparatus for burnishing workpieces, comprising:
   a conveyor for conveying workpieces in succession in a conveying direction along a path from a workpiece-loading station to a workpiece-unloading station;
   an enclosed housing through which the conveyor travels along said path from the workpiece-loading station to the workpiece-unloading station, said housing having an input end at the workpiece-loading station and an output end at the workpiece-unloading station;
   means at the ends of the housing respectively for admitting the conveyor and the successive workpieces on the conveyor into the housing from the workpiece-loading station and for exit of the conveyor and workpieces from the housing to the workpiece-unloading station;
   said housing having blast and rinse chambers successively arranged along the path in the workpiece conveying direction;
   nozzle means at the blast station for directing, under pressure, a stream of a slurry of abrasive particles in a liquid against at least portions of the successive workpieces conveyed along the path on the conveyor at the blast station to burnish said portions;
   rinsing means at the rinse station for rinsing the successive workpieces on the conveyor as the workpieces are conveyed along said path through the rinse station;
   a sump connected to the housing for collecting the slurry from the blast station after the workpieces have been burnished thereby;
   means for recycling the slurry to said nozzles; and
   means for chemically treating the slurry collected from the sump prior to recycling the slurry to said nozzles.

2. The apparatus as claimed in claim 1, further comprising holding means at the blast station for holding the successive workpieces on the conveyor while the nozzle means directs the slurry against the successively advancing workpieces.

3. The apparatus as claimed in claim 2, wherein said holding means comprises a flexible member having ends supported by said housing and weight means on said flexible member to urge the flexible member into pressing contact with the workpieces advancing on the conveyor.

4. The apparatus as claimed in claim 3, wherein said flexible member is made of stainless steel.

5. The apparatus as claimed in claim 1, wherein said means for chemically treating said slurry comprises pH control means for controlling the pH of the slurry.

6. The apparatus as claimed in claim 1, comprising further nozzle means at said rinsing station for directing a rinse liquid against the advancing workpieces after the workpieces have been burnished by said slurry, said sump being connected to collect both the slurry and the rinse liquid from the housing.

7. The apparatus as claimed in claim 6, wherein said housing includes a partition dividing the housing into first and second chambers, said blasting station and rinsing station being located in said first chamber, said second chamber including further rinsing means.

8. The apparatus as claimed in claim 1, wherein said means for recycling the slurry comprises a pump connected to said sump and to said nozzle means, said means for chemically treating the slurry comprising means connected between the sump and the nozzle means for adding chemicals to the recycled slurry to maintain the pH of the slurry substantially constant.

9. The apparatus as claimed in claim 8, wherein the means for chemically treating the slurry comprises a pH sensor in said sump for measuring the pH of the slurry collected therein and controlling the means which adds the chemicals to the recycled slurry in accordance therewith.

10. A method of burnishing workpieces comprising:

conveying successive workpieces on a conveyor in a conveying direction along a path from a workpiece-loading station to a workpiece-unloading station;

advancing the conveyor through an enclosed housing between the workpiece-loading and workpiece-unloading stations of the conveyor;

providing in the housing successive blast and rinse stations in the conveying direction of the workpieces;

directing a stream of a slurry of abrasive particles in a first liquid under pressure through nozzles against at least portions of the successively advancing workpieces at the blast station to burnish said portions;

rinsing the successively advancing workpieces on the conveyor at the rinse station as they are conveyed along said path through the rinse station;

collecting the slurry from the blast station after the slurry has burnished the workpieces; and treating the collected slurry and recycling the thus treated slurry back to the nozzles at the blast station to effect burnishing of subsequently advancing workpieces whereby to provide a substantially uniform treatment of the successive workpieces.

11. A method as claimed in claim 10, wherein the treating of the slurry comprises adjusting the pH of the slurry.

12. A method as claimed in claim 10, wherein the rinsing of the workpieces is effected by utilizing a liquid which is of the same composition as the liquid of the slurry, and collecting with the slurry the rinse liquid after the rinsing of the workpieces and recycling the slurry mixed with rinse liquid to the nozzles.

13. A method as claimed in claim 12, comprising adding abrasive particles to the slurry to maintain the concentration substantially constant.

14. A method as claimed in claim 10, comprising applying resilient holding force to said workpieces as the workpieces advance through said blast station to hold said workpieces in fixed relation on the conveyor while said workpieces are subjected to said slurry stream under pressure.

15. A method of burnishing exposed side manifolds and end surfaces of a heater core, said method comprising directing under pressure, a jet of a slurry of abrasive particles in water against the exposed side manifolds and end surfaces forming the perimeter of a heater core and rinsing said side manifolds and end surfaces to remove any accumulated slurry thereon and leave said side manifolds and end surfaces with a burnished finish whose oxidation is retarded.

16. A method as claimed in claim 15, comprising advancing a plurality of said heater cores in succession through a closed chamber, directing said jet of slurry of abrasive particles against said heater cores as said cores are advancing through said closed chamber and effecting said rinsing of said heater cores in said chamber after the cores have been subjected to the slurry jet.

17. A method as claimed in claim 16, wherein said heater cores are advanced through said closed chamber on a rectilinearly advancing conveyor, said jet of slurry being directed against the advancing heater cores at an angle with respect to the direction of advancement of the conveyor, at opposite sides of the heater core, such that the jets of slurry at the opposite sides of the heater cores are coincident.

18. A method as claimed in claim 17, comprising advancing the heater cores on the conveyor with the heater cores tilted relative to the direction of advancement of the conveyor.

19. A method as claimed in claim 16, comprising recovering the slurry after the slurry has been directed against the heater cores, chemically treating the recovered slurry to maintain the slurry in an alkaline state, and recycling the slurry for treatment of subsequent heater cores advancing through the chamber.

* * * * *